Patented Feb. 8, 1944

2,340,971

UNITED STATES PATENT OFFICE 2,340,971

WATERPROOF TAPE

Frank Nason Manley, Highland Park, and Elwood Paul Wenzelberger, Plainfield, N. J., assignors to Johnson & Johnson, New Brunswick, N. J., a corporation of New Jersey No Drawing. Application April 25, 1939, Serial No. 270,022

5 Claims. (Cl. 117—166)

Our invention relates to the production of waterproof tapes mainly intended for use as waterproof backings of adhesive tapes and of other flexible tapes for other purposes. The thermoplastic material comprising the waterproof coating embodied in our invention essentially embodies a base constituent selected from the group of cellulose derivatives of which mention may be made of cellulose nitrate, cellulose acetate, ethyl cellulose, benzyl cellulose, cellulose aceto-butyrate, cellulose-aceto-proprionatè, or mixture of two or more thereof; the base material being compounded with a suitable plasticizer and, optionally, with fillers, pigments, and such other more or less inert materials as may be deemed expedient or desirable according to the problem in hand.

It is an object of the invention so to compound and treat the stock material that it will economically and otherwise readily lend itself to the form of flexible sheets or films for application to flexible bases, as for example, textile cloth, paper and other sheeted materials, on a calendar similar to an ordinary rubber calendar, or by extrusion in the conventional way. In extended experimentation towards the advancement of this purpose we found it necessary to dispense with volatile solvents because of the fire hazard involved, pinholing, and other attendant disadvantages and so happened upon the wholly unexpected and important discovery that the product of our method exists in the form of a solid solution rather than that of an aggregate. What gives substance to this is the homogeneous nature and appearance of the composition, namely, colorless and transparent when extenders or fillers are not used; the fact that under conditions of heating up to 280° F. there is no tendency for any of the components to separate nor does the plasticizer exude either while the mass is held at an elevated temperature or when it is cooled back to room temperature; the fact that when stored for long periods at temperatures below 35° F. no separation occurs; and the fact that no separation occurs when the composition is sheeted or filmed by conventional extruding devices.

Otherwise stated, the plastic cellulose derivative composition of our coating can be applied, through the medium of heat and pressure, to textile and other sheeted fabrics as a stable flexible coherent preformed film or sheet of predetermined gage or thickness as distinguished from the usual practice of using a solvent mixture and applying the same with a doctor blade or roller and building up the required thickness by additional similar applications.

Generally stated, we have discovered that a material in every way qualified for sheeting or filming particularly as a coating can be produced by compounding a cellulose derivative, a plasticizer and, optionally, a filler and pigment by working, for example, in a steamjacketed kneader at an elevated temperature until the mixture is in a homogeneous state and has the appearance of a transparent or translucent (or colored, dependent on pigment used) soft thermoplastic dough which when cold sets to a homogeneous cohesive mass of varying degrees of plasticity dependent upon composition used and which on re-heating returns to the soft doughlike state. We further have discovered that the compound of our coating composition when in a soft dough-like state readily lends itself to calendering and when so filmed on, for example, a piece of cotton cloth is firmly anchored as a flexible coherent coating to one side of the cloth with no penetration through the other side.

A thermoplastic composition embodying our coating material may comprise

|  | Per cent |
|---|---|
| Cellulose derivative | 29 |
| Filler | 15 |
| Pigment | 5 |
| Plasticizer | 51 | except that the proportions stated may be varied and there may be substitutions of inert materials so long as the mass exhibits thermoplastic sheeting or filming properties.

The cellulosic material may be any of the cellulose derivatives mentioned at the outset, or mixtures thereof, or any other cellulose derivative suitable for the purpose. When cellulose nitrate is employed we prefer to mix it with cellulose acetate or with other appropriate cellulose derivatives in order to lessen the fire hazard.

Fillers are used mainly to reduce cost and to give the composition more body. Hence, fillers may be added or omitted depending upon whether an opaque or clear coating is desired. As fillers we may use china clay, kieselguhr, bentonite or clays employed in rubber compounding or any other inert filling material such as that ordinarily used in plastic compounds. We prefer, however, to use diatomaceous earth properly calcined and treated, such as that known to the trade as "Superfloss."

Suitable pigments or dyes may be used for a colored opaque or clear coating. Any pigment or organic coloring material, or blends thereof may be used, depending upon the color desired, providing the dye or pigment is such as not to be decomposed by the heat of the process. Inorganic pigments likewise are suitable as are also many of the litho colors. For whites, zinc oxide, lithopone, or titanium dioxide as such or in its modified form as on calcium sulphate or on barium sulphate have given excellent results. Titanium dioxide is preferred for white compositions and coatings. In addition to coloring the composition the pigment also functions as an extender and thereby further reduces the cost.

The plasticizer is added to insure flexibility and coherency of the resultant composition or film in the cold state and, hence, to prevent mechanical breakdown of the film. It is selected from the group of plasticizers which are heat-resistant and soluble with cellulose derivatives to form solid solutions. We may employ, however, plasticizers which are not directly soluble with the cellulose compositions by using them in conjunction with a plasticizer that is so qualified. We prefer, however, to use plasticizers which are mutually soluble with respect to cellulose derivatives and, therefore, produce plasticized cellulose compositions which exhibit no exudation phenomena under wide variations of temperature. An example is methyl phthallyl ethyl glycollate or what is known to the trade as "Santicizer M 17." Manifestly, there is a wide choice of plasticizers that are more or less suitable for the purpose, among which may be mentioned triphenyl phosphate, toluene ethyl sulphonamide, toluene sulphonamide, and diethyl phthallate, and particularly oils and mineral oils. Some of these although toxic are quite suitable for industrial tapes and sheetings. For adhesive tapes for surgical uses we prefer, as said before, to use methyl phthallyl ethyl glycollate because it is non-toxic to the human skin, odorless, has high retentivity in the cellulose compound, particularly cellulose acetate, has a very low evaporating rate, is considered inert to rubber adhesive mass, and is extremely soluble in cellulose acetate being soluble in amounts up to 200%.

In a specific embodiment of the coating composition a typical batch would comprise

| | Pounds |
|---|---|
| Superfloss | 25 |
| Titanium dioxide | 10 |
| Santicizer M 17 | 88 |
| Cellulose acetate | 50 |

The Superfloss and titanium dioxide are weighed down and placed in the kneader or mixer which has been previously heated by the application of steam at a pressure of 90-100 lbs. whereupon the mixer is started. The Santicizer M 17 is then added and agitation continued until the mass acquires a somewhat stiff paste-like consistency which it does after a few minutes. The cellulose acetate is then added in portions as much at a time as the mixer will take. When the whole of it has been added, which may require from five to eight minutes, the mixer is operated in closed state for about thirty minutes, or until the mixture is homogeneous and is in the form of a transparent or translucent (or colored) soft thermoplastic dough. The product of this treatment is then dumped into shallow pans or molds to form slabs about one or two inches thick. In this form and while still hot the thermoplastic material is ready for immediate sheeting or filming or it may be allowed to cool and be stored for future use.

If the stock has been permitted to cool or is storage stock it must be re-heated to condition it for calender coating. This may be accomplished on an ordinary rubber mill or warming-up rolls as they are termed. The rolls are heated to about 240-260° F. and the required amount of thermoplastic stock in slab form is fed to the rolls and worked down until it is thoroughly softened which is evidenced when it transfers from one roll to the other. It is then ready for the sheeting or filming operation.

We have found it convenient to apply our novel thermoplastic material to textile, paper, and other flexible bases, on a conventional rubber calender comprising three rolls whereof the middle and bottom rolls are geared for even surface speeds and the middle and top rolls are geared for differential surface speeds to provide the necessary friction capacity. The top and middle rolls are heated to about 265-275° F. and the bottom roll is heated to about 230-250° F. The hot dough-like mass of this treatment is fed into the nip of the top and middle rolls and such rolls are adjusted relative to each other to secure the desired thickness of film which forms on the middle roll. The thickness of the film may be from .001 to .020 of an inch and, obviously, with the benefit of precision adjustment it may be less than .001 or more than .020 as may be required.

When the filming action is completed on the middle roll a web of fabric is fed between the bottom and middle rolls the adjustment between which is sufficient to compel transfer of the preformed film onto the fabric. By varying the pressure between the bottom and middle rolls, the film can be laid on the cloth as a tenacious coherent coating with little or no penetration or it can be pushed into the interstices and through to the other side as may be desired.

Alternatively, the film may be preformed by an extrusion process, the extruded film being laid upon the base cloth or medium in advance of the laminating rolls of the calender above described, or in advance of the rolls of a two-way roll calender.

The coated fabric when it leaves the calender is a finished product requiring no further treatment other than embossing, should such be desired, or the application of adhesive mass when it is intended for use as surgical tape. It readily lends itself to embossing simulating artificial leathers and the like. In unison with the marked white appearance of the film or coating (when white pigmentation is utilized), embossing makes for a very pleasing design when applied to adhesive tape.

Having described the invention, we claim:

1. A waterproof fabric adapted for use as a backing for adhesive tape comprising a flexible fabric base having a flexible waterproof coating calendered thereto, said coating comprising a solid solution of an organic acid ester of cellulose and a non-volatile active solvent plasticizer, the plasticizer being in excess of the amount of cellulose ester and said coating being free of volatile solvent and plasticizer and residues thereof and being stable at room temperatures as well as at normal calendering temperatures.

2. A waterproof fabric adapted for use as a backing for adhesive tape comprising a flexible fabric base having a flexible waterproof coating calendered thereto, said coating comprising a solid solution of substantially 29% organic acid ester of cellulose, substantially 51% of a non-volatile active solvent plasticizer, and substantially 20% of inert materials dispersed in said solid solution, said coating being free of volatile solvents and plasticizers and residues thereof and being stable at room temperatures as well as at normal calendering temperatures.

3. A waterproof fabric adapted for use as a backing for adhesive tape comprising a flexible fabric base having a flexible waterproof coating calendered thereto, said coating comprising a solid solution of cellulose acetate, a non-volatile active solvent plasticizer, and inert materials, the plasticizer being in excess of the amount of cellulose acetate and said coating being free of volatile solvents and plasticizers and residues thereof and being stable at room temperatures as well as at normal calendering temperatures.

4. A waterproof fabric adapted for use as a backing for adhesive tape comprising a flexible fabric base having a flexible waterproof coating calendered thereto, said coating comprising a solid solution of cellulose acetate, methyl phthallyl ethyl glycolate, and inert materials, said coating being free of volatile solvents and plasticizers and residues thereof and being stable at room temperatures as well as at normal calendering temperatures.

5. A waterproof fabric adapted for use as a backing for adhesive tape comprising a flexible fabric base having a flexible waterproof coating calendered thereto, said coating comprising a solid solution of substantially 50 pounds of cellulose acetate, substantially 88 pounds of methyl phthallyl ethyl glycolate, and 35 pounds of inert materials, said coating being free of volatile solvents and plasticizers and residues thereof and being stable at room temperatures as well as at normal calendering temperatures.

FRANK NASON MANLEY.
ELWOOD PAUL WENZELBERGER.

CERTIFICATE OF CORRECTION.

Patent No. 2,340,971. February 9, 1944.

FRANK NASON MANLEY, ET AL.

It is hereby certified that error appears in the printed specification of the above numbered patent requiring correction as follows: Page 1, first column, lines 23 and 24, for "calendar" read --calender--; page 2, first column, line 49, for "Pounds" read --Pounds (more or less)--; and that the said Letters Patent should be read with this correction therein that the same may conform to the record of the case in the Patent Office.

Signed and sealed this 18th day of April, A. D. 1944.

Leslie Frazer (Seal) Acting Commissioner of Patents.